US010939351B2

(12) United States Patent
Xu et al.

(10) Patent No.: US 10,939,351 B2
(45) Date of Patent: Mar. 2, 2021

(54) MOBILE DEVICE AND DIRECTIONAL ANTENNA ADJUSTMENT METHOD OF MOBILE DEVICE (71) Applicant: BOE TECHNOLOGY GROUP CO., LTD., Beijing (CN)

(72) Inventors: Jian Xu, Beijing (CN); Xinyin Wu, Beijing (CN); Yongchun Lu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 45 days.

(21) Appl. No.: 15/757,559

(22) PCT Filed: Sep. 21, 2017

(86) PCT No.: PCT/CN2017/102575
§ 371 (c)(1),
(2) Date: Mar. 5, 2018

(87) PCT Pub. No.: WO2018/188274
PCT Pub. Date: Oct. 18, 2018

(65) Prior Publication Data
US 2019/0028949 A1 Jan. 24, 2019

(30) Foreign Application Priority Data

Apr. 14, 2017 (CN) .......................... 201710245745.8

(51) Int. Cl.
H04W 36/32 (2009.01)
H01Q 3/44 (2006.01)
(Continued)

(52) U.S. Cl.
CPC .............. H04W 36/32 (2013.01); G01S 3/42 (2013.01); H01Q 1/243 (2013.01); H01Q 3/247 (2013.01);
(Continued)

(58) Field of Classification Search
None
See application file for complete search history.

(56) References Cited

U.S. PATENT DOCUMENTS 6,400,937 B1    6/2002  Charas et al.
6,671,265 B1 * 12/2003  Hwang ............... H04W 24/08
                                                370/331
(Continued)

FOREIGN PATENT DOCUMENTS

CN    1158208 A    8/1997
CN    1233376 A    10/1999
(Continued)

OTHER PUBLICATIONS

International Search Report of PCT/CN2017/102575 in Chinese, dated Dec. 5, 2017 with English translation.
(Continued)

Primary Examiner — Mohammed Rachedine
(74) Attorney, Agent, or Firm — Collard & Roe, P.C.

(57) ABSTRACT

A mobile device, including: a direction sensor, a signal processing unit and a directional antenna unit, said direction sensor being configured to detect a current movement direction of said mobile device; said signal processing unit being configured to determine an antenna adjustment direction of said directional antenna unit according to said current movement direction, said antenna adjustment direction being related to said current movement direction; and said directional antenna unit being configured to adjust the antenna direction from a first direction to a second direction according to said antenna adjustment direction.

18 Claims, 4 Drawing Sheets (51) Int. Cl.
*H01Q 1/24* (2006.01)
*H01Q 3/26* (2006.01)
*H01Q 15/00* (2006.01)
*H01Q 3/00* (2006.01)
*H01Q 3/24* (2006.01)
*H04W 48/04* (2009.01)
*H04W 64/00* (2009.01)
*H04B 1/3827* (2015.01)
*G01S 3/42* (2006.01)

(52) U.S. Cl.
CPC ............. *H01Q 3/2605* (2013.01); *H01Q 3/44* (2013.01); *H01Q 15/0086* (2013.01); *H04W 48/04* (2013.01); *H04W 64/006* (2013.01)

(56) References Cited

U.S. PATENT DOCUMENTS

| | | |
|---|---|---|
| 7,996,034 B1 | 8/2011 | Yegnashankaran et al. |
| 2001/0031648 A1 | 10/2001 | Proctor, Jr. et al. |
| 2004/0082311 A1 | 4/2004 | Shiu et al. |
| 2004/0104839 A1 | 6/2004 | Velazquez et al. |
| 2004/0198229 A1 | 10/2004 | Hirata |
| 2005/0197071 A1 | 9/2005 | Yoshida et al. |
| 2005/0275597 A1 | 12/2005 | Tian et al. |
| 2007/0057843 A1 | 3/2007 | Chang et al. |
| 2013/0040655 A1 | 2/2013 | Keidar |
| 2013/0040682 A1 | 2/2013 | Chang et al. |
| 2013/0083774 A1* | 4/2013 | Son ................. H04B 7/0695 370/331 |
| 2015/0119045 A1* | 4/2015 | Montgomery ..... G01R 29/0807 455/437 |
| 2015/0236778 A1* | 8/2015 | Jalali ................. H04B 7/18506 370/316 |
| 2016/0286407 A1* | 9/2016 | Simonsson ......... H04W 72/085 |

FOREIGN PATENT DOCUMENTS

| | | | |
|---|---|---|---|
| CN | 1333978 A | | 1/2002 |
| CN | 1531221 A | | 9/2004 |
| CN | 1675859 A | | 9/2005 |
| CN | 1729633 A | | 2/2006 |
| CN | 101069446 A | | 11/2007 |
| CN | 101466132 A | | 6/2009 |
| CN | 103748799 A | | 4/2014 |
| CN | 103812542 A | | 5/2014 |
| CN | 105635974 A | | 6/2016 |
| CN | 107733534 A | * | 2/2018 |
| EP | 0 772 950 B1 | | 4/2002 |
| EP | 1 553 789 A2 | | 7/2005 |
| WO | 00/31991 A1 | | 6/2000 |

OTHER PUBLICATIONS

Notice of Transmittal of the International Search Report of PCT/CN2017/102575 in Chinese, dated Dec. 5, 2017.
Written Opinion of the International Searching Authority of PCT/CN2017/102575 in Chinese, dated Dec. 5, 2017 with English translation.
Second Chinese Office Action in Chinese Application No. 201710245745.8 dated Aug. 11, 2020 with English translation.
European Search Report in European Patent Application No. 17844649.8 dated Oct. 12, 2020.

* cited by examiner

MOBILE DEVICE AND DIRECTIONAL ANTENNA ADJUSTMENT METHOD OF MOBILE DEVICE

CROSS REFERENCE TO RELATED APPLICATIONS

This application is the National Stage of PCT/CN2017/102575 filed on Sep. 21, 2017, which claims priority under 35 U.S.C. § 119 of Chinese Application No. 201710245745.8 filed on Apr. 14, 2017, the disclosure of which is incorporated by reference.

TECHNICAL FIELD

Embodiments of the present disclosure relate to a mobile device and a directional antenna adjustment method of the mobile device.

BACKGROUND

With the wide spreading of Internet and rapid development of mobile interneting technology, intelligent hardware devices with more humanity are variously proposed. mobile devices are further applied in various occasions for operations such as communication and network surfing.

The antenna systems for existing mobile devices are generally directional antenna system without directionality. When a mobile device is used in the environment of high speed motion, such as a user traveling by high speed train or driving on highway, cells of neighboring base stations will be passed in short time due to the high speed. If an antenna without directionality is used, it is impossible to handover to the next cell because of continuously receiving signals from the current cell and communicating with it, which will result in communication delay of the mobile device.

SUMMARY

The object of embodiments of the present disclosure is to provide a mobile device and a method of adjusting antenna of the mobile device to address the above-mentioned technical problem.

According to at least one embodiment of this disclosure, a mobile device is provided, comprising: a direction sensor, a signal processing unit and a directional antenna unit, the direction sensor is configured to detect a current movement direction of the mobile device; the signal processing unit is configured to determine an antenna adjustment direction of the directional antenna unit according to the current movement direction, wherein the antenna adjustment direction is related to the current movement direction; the directional antenna unit can transmit electromagnetic wave for communication of the mobile device and is configured to adjust the antenna direction from a first direction to a second direction such that the strength of electromagnetic waves transmitted by the directional antenna unit in the second direction is greater than that of the electromagnetic waves transmitted in the first direction.

For example, the direction sensor comprises a gyroscope and/or an acceleration sensor.

For example, the signal processing unit further comprises a signal detecting unit, the signal detecting unit is configured to detect signals from a signal cell in the movement direction, when signals from the signal cell in the direction are detected, the signal processing unit sends an antenna adjustment instruction to the directional antenna unit that adjusts the antenna direction from the first direction to the second direction according to the antenna adjustment instruction and the antenna adjustment direction.

For example, the signal detecting unit is further configured to further determine a signal strength of the signal cell when detecting signals from the signal cell in the signal adjustment direction; when the signal strength is greater than a preset strength threshold, the signal processing unit sends the antenna adjustment instruction to the directional antenna unit.

For example, the mobile device further comprises a positioning device, the positioning device is configured to detect a current location of the mobile device; the signal processing unit is further configured to determine the antenna adjustment direction of the directional antenna unit according to the current position and the current movement direction.

For example, the signal processing unit determines a next signal cell the mobile device is to enter according to the current location and the current movement direction of the mobile device; determines a location of a base station of the next signal cell; determines an antenna adjustment direction of the directional antenna unit based on the location of the base station.

For example, the signal processing unit determines a first signal cell and a second signal cell that the mobile device might enter according to the current location and the current movement direction of the mobile device, and a signal detecting unit in the signal processing unit detects signal strength of the first signal cell and the second signal cell and determines a signal cell with a strongest signal strength; determines the signal cell with the strongest signal strength as the next signal cell the mobile device is to enter.

For example, the signal processing unit comprises a signal receiver and a signal modulator, the signal receiver acquires information on the antenna adjustment direction; the signal modulator modulates the information on the antenna adjustment direction from digital signal into the analog electrical signal.

For example, the directional antenna unit is at least one of the phased array directional antenna or the metamaterial antenna.

For example, when the mobile device moves along the current movement direction, the directional antenna unit compares an angle value between the movement direction and of the antenna direction and determines whether direction correction is necessary, and if an accumulated error of a plurality of samplings is greater than a preset angle value for the directional antenna unit, determines that the antenna adjustment function needs to be corrected.

According to at least one embodiment of this disclosure, a method for adjusting an antenna of a mobile device is provided, comprising: detecting a current movement direction of the mobile device; determining an antenna adjustment direction of the directional antenna unit in the mobile device according to the current movement direction, wherein the antenna adjustment direction is related to the current movement direction; adjusting a direction of the antenna from a first direction to a second direction according to the antenna adjustment direction.

For example, the direction sensor comprises a gyroscope and/or an acceleration sensor.

For example, the method further comprises: establishing connection with and communicating with a signal cell in the second direction in response to that the direction of the antenna direction is adjusted from the first direction to the second direction.

For example, the method further comprises: detecting signals from a signal cell in the direction based on the antenna adjustment direction; sending an antenna adjustment instruction to the directional antenna unit after signals from the signal cell is detected in the direction; the step of adjusting the direction of the antenna from the first direction to the second direction according to the antenna adjustment direction comprises: adjusting the direction of the antenna from the first direction to the second direction according to the antenna adjustment instruction and the antenna adjustment direction.

For example, the method further comprises: further determining a signal strength of the signal cell when signals from the signal cell is detected in the signal adjustment direction; the step of sending an antenna adjustment instruction to the directional antenna unit after signals from the signal cell is detected in the direction comprises: when the signal strength is greater than a preset strength threshold, sending the antenna adjustment instruction to the directional antenna unit.

For example, the method further comprising: detecting a current location of the mobile device; the step of determining an antenna adjustment direction of the directional antenna unit in the mobile device according to the current movement direction comprises: determining the antenna adjustment direction of the directional antenna unit according to the current position and the current movement direction.

For example, the step of determining the antenna adjustment direction of the directional antenna unit according to the current position and the current movement direction comprises: determining a next signal cell the mobile device is to enter according to the current location and the current movement direction of the mobile device; determines a location of a base station of the next signal cell; determines an antenna adjustment direction of the directional antenna unit based on the location of the base station.

For example, the step of determining a next signal cell the mobile device is to enter according to the current location and the current movement direction of the mobile device comprises: determining a first signal cell and second signal cell that the mobile device might enter according to the current location and the current movement direction of the mobile device; detecting signal strength of the first signal cell and the second signal cell and determining a signal cell with a strongest signal strength; determining the signal cell with the strongest signal strength as the next signal cell the mobile device is to enter.

For example, the directional antenna unit is at least one of the phased array directional antenna or the metamaterial antenna.

For example, when the mobile device moves along the current movement direction, the directional antenna unit compares an angle value between the movement direction and the antenna direction and determines whether direction correction is necessary, and if an accumulated error of a plurality of samplings is greater than a preset angle value for the directional antenna unit, determines that the antenna adjustment function needs to be corrected.

In embodiments of the present disclosure, it is possible to adjust direction in which the mobile device receives signals and directional signal reception and transmission function is achieved. The communication effect is better for a mobile device in motion to receive base station signals transmitted in the motion direction, enabling faster response to mobile device's switching base station.

BRIEF DESCRIPTION OF THE DRAWINGS

In order to explain the technical solution in embodiments of the present disclosure more clearly, accompanying drawings to be used in description of embodiments will be described briefly below. The accompanying drawings in the following description are merely illustrative embodiments of the present disclosure.

DETAILED DESCRIPTION

Hereinafter, preferred embodiments of the present disclosure will be described in detail with reference to accompanying drawings. It is to be noted that in the present description and the drawings, basically identical steps and elements will be denoted by same reference numerals and redundant explanation thereof will be omitted.

In the following embodiments of the present disclosure, the mobile device may refer to an electronic device capable of communicating or network accessing over a wireless network, including for example a cell phone, a notebook computer, a tablet computer, a POS machine, and an on-vehicle computer. Further, the mobile device may have a plurality of application functions and a certain processing capability, such as smart phone.

Figure 1:
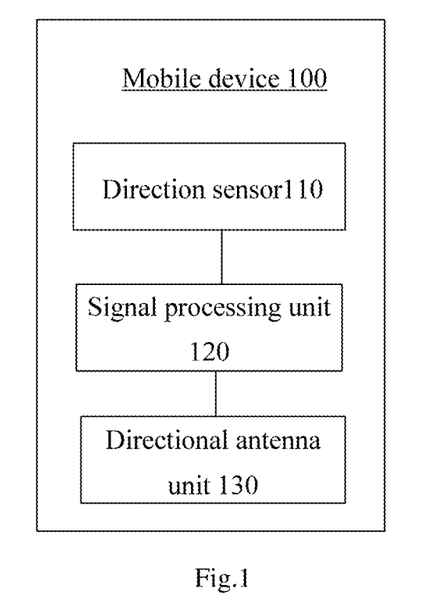
FIG. 1 shows a structure diagram of a mobile device according to an embodiment of the present disclosure.

FIG. 1 shows a structure diagram of a mobile device according to an embodiment of the present disclosure. Referring to FIG. 1, the mobile device 100 includes a direction sensor 110, a signal processing unit 120 and a directional antenna unit 130.

According to an example of the present disclosure, said direction sensor 110 detects the current movement direction of the mobile device 100. The signal processing unit 120 determines the antenna adjustment direction of the directional antenna unit 130 according to the current movement direction of the mobile device, wherein said antenna adjustment direction is related to the current movement direction of said mobile device. The directional antenna unit 130 adjusts the antenna's direction from the first direction to the second direction in which said antenna adjustment direction and the second direction are the movement direction of the mobile device or the direction in which the nearest base station is located in the movement direction.

In an embodiment of the present disclosure, the direction sensor 110 is configured to detect the current movement direction of the mobile device. The direction sensor 110 may include, for example, a gyroscope and/or an acceleration sensor.

The gyroscope may measure the relative deflection angle of the mobile device 100. There is a top inside the gyroscope which has an axis always parallel to an initial direction due to the gyroscopic effect, so that the actual direction may be calculated from the deviation from the initial direction. For example, the gyroscopic sensor in a mobile device has a chip with a very precise structure in which ultra-small tops may be contained. The measuring reference standard of a gyroscopic sensor is the top spinning in the direction perpendicular to the ground in the middle of it. The result is obtained from the angle between the mobile device 100 and the top. Therefore it is possible to mount a gyroscope in a mobile device to determine how many degrees the mobile device is deviated from X, Y and Z axes in the earth frame respectively.

The acceleration sensor can measure the moving acceleration of the mobile device. For example, the acceleration sensor may be a triaxial acceleration sensor for measuring accelerations of the mobile device in three directions. With the acceleration sensor, a certain medium experiences deformation due to the acceleration, the deformation amount is measured and converted into a voltage output with relevant circuit. The mobile device 100 moves in any direction and the acceleration sensor would output signals. The acceleration sensor will not output signal when the mobile device 100 is at rest.

The moving direction of the mobile device may be calculated by the gyroscope and/or acceleration sensor, for example, whether the mobile device is in moving state or rest state, in which direction it is moving, the moving speed, the acceleration etc. The moving direction of the mobile device 100 in X, Y and Z axes may be detected precisely according to the earth frame. As compared to other approaches, the system structure and algorithm are simpler and the cost is lower when calculating the moving direction of the mobile device with the gyroscope and/or acceleration sensor. Of course, the gyroscope and the acceleration sensor are merely examples and one skilled in the art should appreciate that parameters such as moving direction of a mobile device may also be acquired in other ways.

The signal processing unit 120 determines the antenna adjustment direction of the directional antenna unit 130 according to the current movement direction of the mobile device, wherein the antenna adjustment direction is related to the current movement direction of the mobile device.

Figure 2:
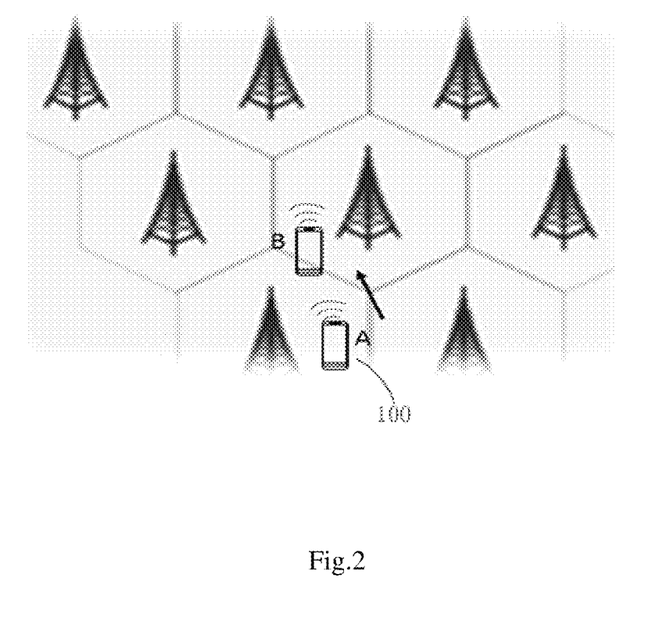
FIG. 2 shows a diagram of a mobile device's antenna switching according to an embodiment of the present disclosure.

According to an example of the present disclosure, the antenna adjustment direction is consistent with the current movement direction of the mobile device. For example, when the signal processing unit 120 determines that the current movement direction of the mobile device is due south, it is possible to determine the antenna adjustment direction of the directional antenna unit 130 as due south. FIG. 2 shows a diagram of a mobile device's antenna switching according to an embodiment of the present disclosure. For example, referring to FIG. 2, the mobile device 100 moves from A to B while A and B belong to different cells. According to an embodiment of the present disclosure, when it is determined that the mobile device 100 moves from A to B, it is possible to adjust the antenna direction from the current direction to the direction of a line connecting A and B and towards B.

Alternatively, the antenna adjustment direction may also be the direction after necessary correction on the basis of the current movement direction. For example, after determining the current movement direction of the mobile device, the current movement direction is corrected according to accumulated error etc. and the corrected direction is used as the antenna adjustment direction.

The directional antenna unit 130 adjusts the antenna direction of the mobile device 100 from the first direction to the second direction according to said antenna adjustment direction. The directional antenna unit 130 may control the antenna to receive and transmit signals in a certain direction, which is different from common antennas that may radiate signals all around for receiving and transmitting signals. According to an example of the present disclosure, the directional antenna may be at least one of the phased array directional antenna or the metamaterial antenna.

The metamaterial is an artificial composite material made by arranging periodic or non-periodic artificial microstructures which implements response to electromagnetic field or sonar by artificial "atoms" by design and machining of artificial microstructures. The metamaterial directional antenna may be a directional antenna with high directionality and zero refractive index obtained by embedding a directional antenna into a zero refractive index metamaterial. It may also be a highly directional microstrip antenna in which a mesh-like structure zero refractive index metamaterial is disposed over a directional antenna.

A phased array antenna changes direction by controlling the phase of feeding of radiation unit in an array directional antenna. Controlling phase may change the pointing direction of the maximum value of the directional diagram of a directional antenna for the purpose of beam sweeping. Its feeding phase is generally controlled by an electronic computer, which has a rapid phase variation speed such as on the order of milliseconds, that is, the change of pointing direction of the maximum value of the directional antenna directional diagram or other parameters is quick.

Figure 3:
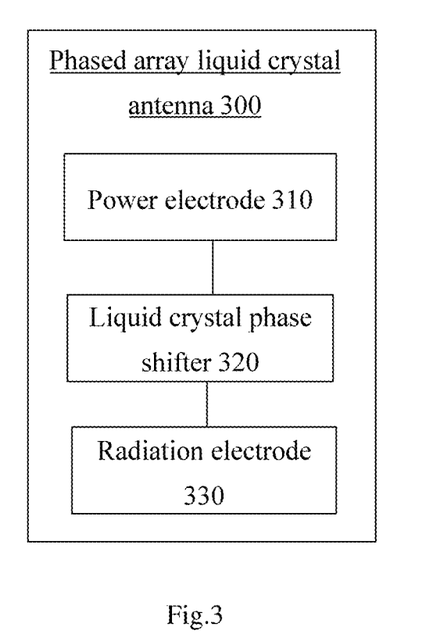
FIG. 3 shows a structure diagram of a mobile device in which there is a phased array liquid crystal antenna according to an embodiment of the present disclosure.

According to an example of the present disclosure, the phased array directional antenna may be a phased array liquid crystal antenna. FIG. 3 shows a structure diagram of a phased array liquid crystal antenna according to an embodiment of the present disclosure. Referring to FIG. 3, the phased array liquid crystal antenna 300 includes a power electrode 310, a liquid crystal phase shifter 320 and a radiation electrode 330.

Figure 8:
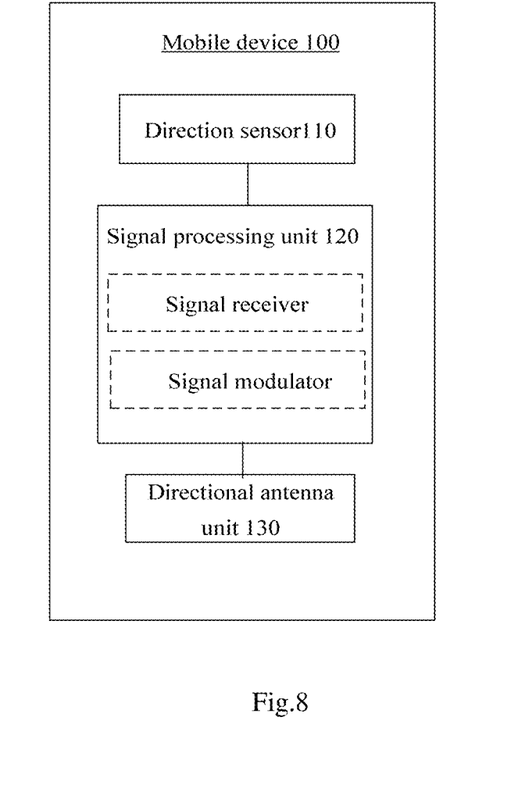
FIG. 8 shows another structure diagram of a mobile device according to an embodiment of the present disclosure.

FIG. 8 shows another structure diagram of a mobile device according to an embodiment of the present disclosure. Referring to FIG. 8, according to an example of the present disclosure, the signal processing unit 120 includes a signal receiver and a signal modulator, in which the signal receiver acquires the antenna adjustment direction information and transmits it to the signal modulator and the signal modulator modulates the antenna adjustment direction information from digital signal to analog signal. Then, the signal processing unit 120 sends the analog signals to the phased array liquid crystal antenna 300. In this way, the phased array liquid crystal antenna 300 regulates the voltage across the power electrode 310 based on the analog signals to adjust the liquid crystal dielectric constant of the liquid crystal phase shifter 320; and adjusts phase of electromagnetic wave transmitted/received by the radiation electrode 330 based on variation of dielectric constant, thereby changing the direction of the phased array liquid crystal antenna.

Here, the signal modulator includes a driving chip connected with the phased array liquid crystal antenna. Optionally, the signal modulator may include one of or any combination of an AD converter, a signal amplifier or a decoder. As compared to the conventional mechanical method for rotating directional antenna, the phased array liquid crystal antenna features fast adjustment speed and high precision.

In embodiments of the present disclosure, the direction of a directional antenna is changed according to the movement direction of a mobile device such that the direction of the antenna faces the movement direction of the mobile device, thereby maximizing signal strength in the movement direction. Thus, the mobile device may establish connection with the next cell in the movement direction in time, thereby reducing or avoiding occurrence of communication delay.

Figure 4:
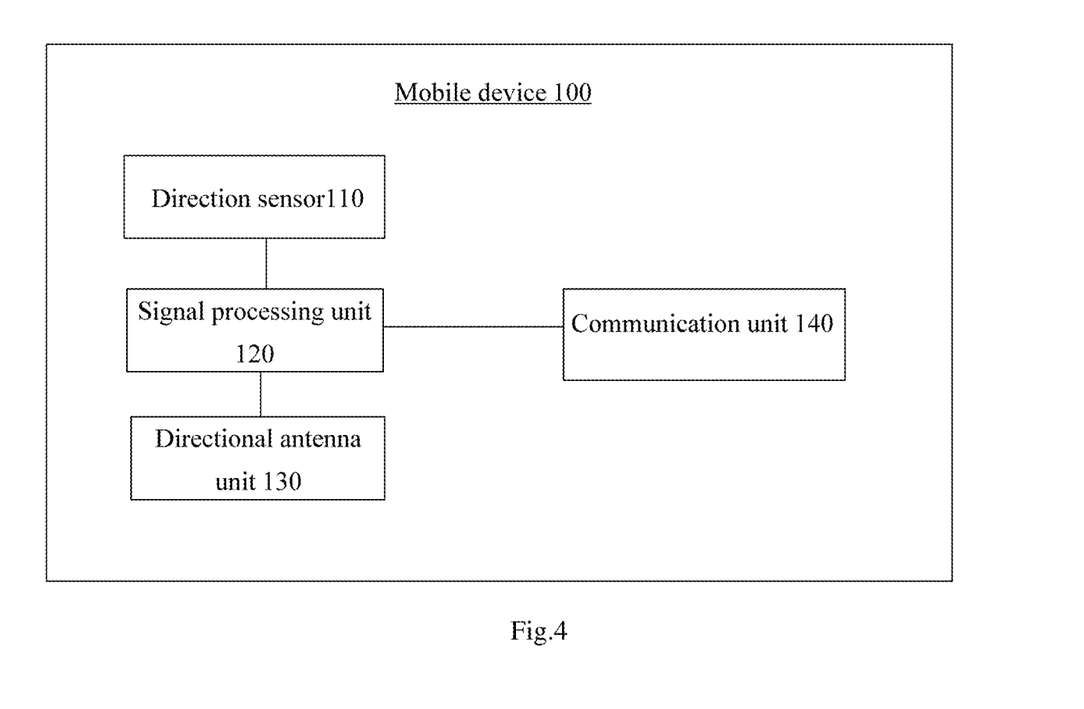
FIG. 4 shows another structure diagram of a mobile device according to an embodiment of the present disclosure.

FIG. 4 shows another structure diagram of a mobile device according to an embodiment of the present disclosure. Referring to FIG. 4, the mobile device may further include a communication unit 140. The communication unit 140 establishes communication with and communicates with the signal cell in the second direction in response to adjusting the direction of the directional antenna from the first direction to the second direction. For example, the communication unit 140 may acquire communication parameters of the signal cell in the second direction and establish connection with the cell based on the communication parameters. For example, the communication unit 140 may acquire the communication protocol for the next cell first and establish connection with the cell according to the communication protocol to receive and transmit information. Alternatively, when there are a plurality of signal cells in the second direction, the communication unit 140 may also establish connections with a plurality of cells respectively. Alternatively, the communication unit 140 may also establish connection with the signal cell in the adjusted direction according to the antenna adjustment direction after the signal processing unit 120 determines the antenna adjustment direction. That is, the operation of establishing connection with the next cell may be carried out before, during or after adjusting the antenna direction.

Figure 5:
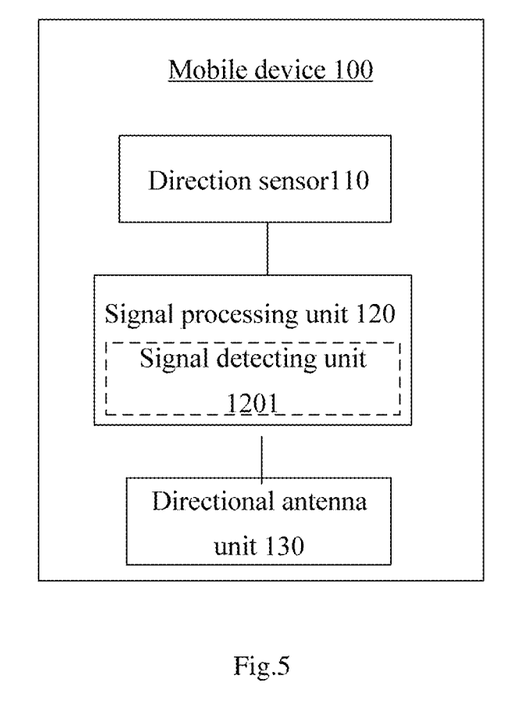
FIG. 5 shows yet another structure diagram of a mobile device according to an embodiment of the present disclosure.

FIG. 5 shows another structure diagram of a mobile device according to an embodiment of the present disclosure. Referring to FIG. 5, in the mobile device 100, the signal processing unit 120 further includes a signal detecting unit 1201.

The signal detecting unit 1201 detects signals from the signal cell in the signal adjustment direction based on the antenna adjustment direction. When signals from the signal cell in the direction are detected, the signal processing unit 120 sends an antenna adjustment instruction to the directional antenna unit 130 that adjusts the antenna direction from the first direction to the second direction according to the directional antenna adjustment instruction and the antenna adjustment direction. For example, when the signal processing unit 120 determines the antenna adjustment direction according to the current movement direction of the mobile device, the signal detecting unit 1201 needs to further detect signals from the signal cell towards which the antenna adjustment direction is. And send an antenna adjustment instruction to the directional antenna unit 130 such that the antenna direction is adjusted from the first direction to the second direction only when signals from a certain cell in the direction are detected. For example, referring to FIG. 2, when the signal processing unit 120 determines that the mobile device 100 is moving from A to B, the signal detecting unit 1201 needs to further detect signals from the signal cell to which B belongs and the signal processing unit 120 does not transmit the antenna adjustment instruction until signals are detected from the cell. If the antenna direction is switched when the mobile device is at location A, the mobile device 100 might not connect with the cell in which A is located, and the mobile device 100 does not arrive at B yet, so neither does it can receive signals from the signal cell at location B, which will result in network connection failure or network delay. Therefore, the embodiment of the present disclosure can avoid problems of network connection failure or network delay effectively.

According to another example of the present disclosure, when signals from the signal cell in said signal adjustment direction are detected, said signal detecting unit 1201 may further determine the signal strength of the signal cell. When the signal strength is greater than a preset strength threshold, said signal processing unit 120 sends said antenna adjustment instruction to said directional antenna unit 130 to adjust the antenna direction. The preset strength threshold is for example a signal strength reaching 30% or 50% of the standard strength. As another example, when the signal detecting unit 130 detects signals from a plurality of signal cells in the movement direction of the mobile device 100, it is possible to adjust the antenna to the direction in which the signal is strongest and the communication unit may establish connection with the cell with strongest signal. In the above example, it is possible to avoid resource wasting because of the mobile device establishing connection with a plurality of cells and may avoid failure of receiving signals from the current cell due to too early switching at the same time.

Figure 6:
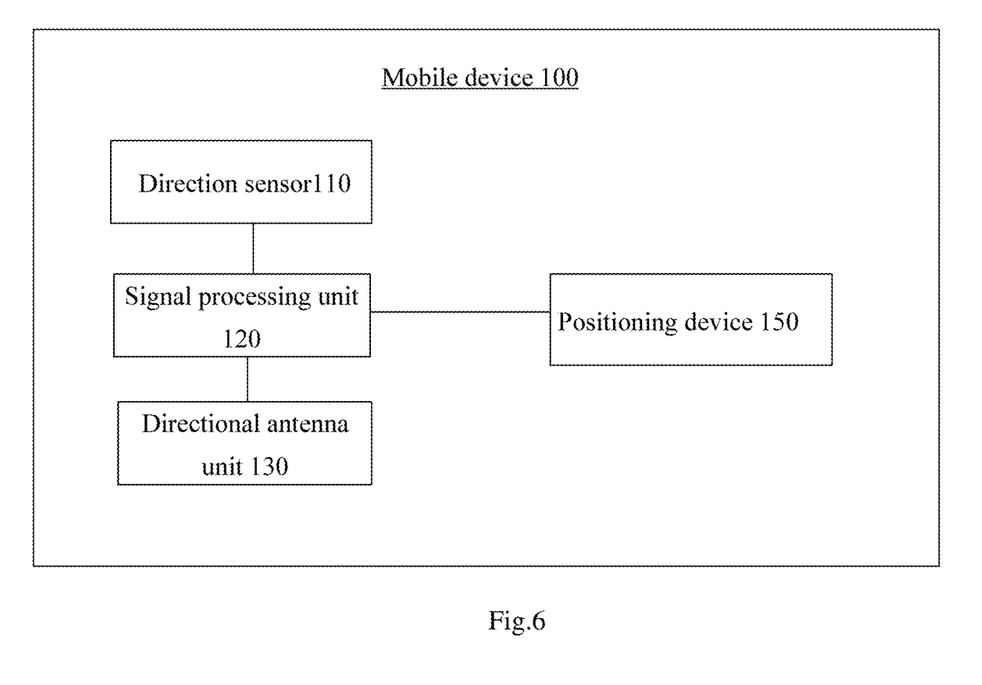
FIG. 6 shows yet another structure diagram of a mobile device according to an embodiment of the present disclosure.

FIG. 6 shows yet another structure diagram of a mobile device according to an embodiment of the present disclosure. Referring to FIG. 6, the mobile device 100 may further include a positioning device 150. The positioning device 150 may detect the current location of the mobile device 100. Thus, the signal processing unit 120 may determine the antenna adjustment direction of the directional antenna unit 130 according to the current position of the mobile device 100 and the current movement direction. For example, the mobile device 100 may store a map of locations of various cells therein beforehand. Thus, it is possible to determine which cell is the next cell the mobile device 100 is to enter and adjust the antenna unit to face the direction of the cell according to the prestored map of various cells. Furthermore, it is also possible to determine the location of the base station of the signal cell according to the prestored signal cell map. Thus, the signal processing unit 120 may determine the antenna adjustment direction of the directional antenna unit based on the location of the base station. For example, the antenna unit is adjusted to the direction in which the base station transmits and receives signals. In this way, it is possible to guarantee that the mobile device transmits and receives signals in the optimal angle.

According to an example of the present disclosure, when the signal processor 120 determines that the mobile device might enter a plurality of signal cells such as the first signal cell and the second signal cell according to the current location of the mobile device 100. At this point, the signal detecting unit 1201 in the signal processor 120 may detect the signal strength in the first signal cell and the second signal cell and determine which signal cell has strongest signal strength, and determine the signal cell with the strongest signal strength as the next signal cell into which the mobile device prepares to enter, and adjust the antenna to face the signal cell.

In embodiments of the present disclosure, it is possible to determine antenna adjustment direction of the mobile device according to the current movement direction and other secondary parameters of the mobile device, which enables more precise determination of the antenna adjustment direction and effectively avoids technology problem of network delay due to failure of receiving signals.

The structure and operation mode of the mobile device according to embodiments of the present disclosure have been described above. The method for adjusting antenna of a mobile device according to an embodiment of the present disclosure will be further described below. The antenna adjusting method is the method for adjusting the antenna in the mobile device in the aforementioned embodiments and therefore corresponds to the structure and function of the mobile device. For the purpose of briefness of the description, only the method will be described briefly here and the mobile device in the aforementioned embodiments may be referred to for specific contents.

Figure 7:
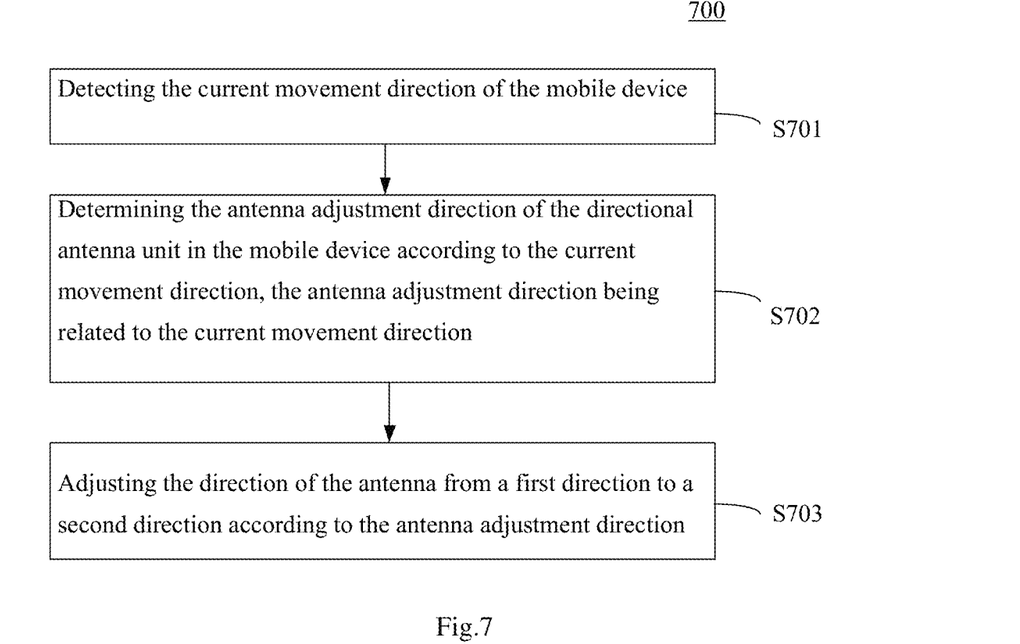
FIG. 7 shows a flow chart of a method for adjusting antenna of a mobile device according to an embodiment of the present disclosure.

FIG. 7 shows a flow chart of a method for adjusting antenna of a mobile device according to an embodiment of the present disclosure. Referring to FIG. 7, in step S701, the current movement direction of the mobile device is detected.

In step S702, the antenna adjustment direction of the directional antenna unit in the mobile device is determined according to the current movement direction, which is related to the current movement direction.

In step S703, the direction of the antenna is adjusted from the first direction to the second direction according to the antenna adjustment direction.

According to an example of the present disclosure, said direction sensor includes a gyroscope and/or an acceleration sensor.

According to an example of the present disclosure, the method for adjusting antenna of a mobile device further includes: establishing connection with and communicating with the signal cell in the second direction in response to adjusting the direction of the antenna from the first direction to the second direction.

According to an example of the present disclosure, the method for adjusting the antenna of the mobile device further includes: based on the antenna adjustment direction, detecting signals from the signal cell in the direction; and sending an antenna adjustment instruction to the directional antenna unit when detecting signals from the signal cell in the direction; the step of adjusting the direction of the antenna from the first direction to the second direction according to the antenna adjustment direction includes: adjusting the direction of the antenna from the first direction to the second direction according to the antenna adjustment instruction and the antenna adjustment direction.

According to an example of the present disclosure, the method for adjusting the antenna of a mobile device further includes: further determining the signal strength of the signal cell when detecting signals from the signal cell in the signal adjustment direction; and the step of sending the antenna adjustment instruction to the directional antenna unit includes: sending the antenna adjustment instruction to the directional antenna unit when the signal strength is greater than the preset strength threshold.

According to an example of the present disclosure, the method for adjusting the antenna of the mobile device further includes: detecting the current location of the mobile device; and the step of determining the antenna adjustment direction of the directional antenna unit in the mobile device according to the current movement direction includes: determining the antenna adjustment direction of the directional antenna unit according to the current location and the current movement direction.

According to an example of the present disclosure, the step of determining the antenna adjustment direction of the directional antenna unit according to the current location and the current movement direction includes: determining the next signal cell the mobile device is to enter according to the current location and the current movement direction of the mobile device; determining the location of the base station of the next signal cell; and determining the antenna adjustment direction of the directional antenna unit based on the location of the base station.

According to an example of the present disclosure, the step of determining the next signal cell the mobile device is to enter according to the current location and the current movement direction of the mobile device includes: determining that the mobile device might enter the first signal cell and the second signal cell according to the current location and the current movement direction of the mobile device; detecting the signal strength of the first signal cell and the second signal cell and determining the signal cell with the maximum signal strength; and determining the signal cell with the maximum signal strength as the next signal cell the mobile device is to enter.

According to an example of the present disclosure, the directional antenna unit is a phased array liquid crystal antenna including a power electrode, a liquid crystal phase shifter and a radiation electrode, and the step of adjusting the direction of the antenna from the first direction to the second direction includes: converting the antenna adjustment direction of the directional antenna unit into analog electrical signals; adjusting the voltage of the power electrode of the directional antenna unit based on the analog electrical signals to adjust the liquid crystal dielectric constant of the liquid crystal phase shifter and adjusting the phase of electromagnetic waves transmitted/received by the radiation electrode based on the variation of the dielectric constant.

According to an example of the present disclosure, the method for adjusting the antenna of the mobile device further includes: acquiring information on the antenna adjustment direction; the step of converting the antenna adjustment direction of the directional antenna unit into analog electrical signals includes: modulating, by the signal modulator, the information on the antenna adjustment direction into analog electrical signals. The signal modulator may include a driving chip connected with the phased array liquid crystal antenna.

According to an example of the present disclosure, the directional antenna unit is at least one of the phased array directional antenna or the metamaterial antenna.

According to an example of the present disclosure, when the mobile device moves along the current movement direction, the directional antenna unit samples errors according to one period, that is, a determination is made as to whether direction correction is necessary by comparing an angle value between the movement direction and the antenna direction, and it is considered that the antenna adjustment function needs to be corrected if accumulated error of multiple samplings is greater than a preset angle value for the directional antenna unit, namely adding the accumulated error to or subtracting the accumulated error from the direction in which the antenna is adjusted for each time.

With the method for adjusting antenna in embodiments of the present disclosure, it is possible to adjust antenna direction for receiving signals of the mobile device, which addresses the problem of disconnection caused by the mobile device receiving signals in the non-movement direction while the mobile device is in high speed motion.

The skilled in the art may realize that, the units and arithmetic process in each example described with the embodiments disclosed in this disclosure can be achieved through electronic hardware, computer software or the combination of the both. Also, the software module may be set in any kinds of computer mediums. In order to describe clearly the interchangeability of hardware and software, the constitution and steps of each example have been described generally in terms of function in the description above. These functions is implemented with hardware or software is due to the specific application and design restriction condition of the technical solution. The skilled in the art may use different method to achieve the described function pointing to each specific application, however, the achievement should not be considered over the scope of this disclosure.

Those skilled in the art should appreciate that various modifications, combinations, sub-combinations and substitutions may be done depending on design requirements and other factors as long as they fall within the scope of the accompanying claims and their equivalents.

The present application claims priority of China Patent application No. 201710245745.8 filed on Friday, Apr. 14, 2017, the content of which is hereby incorporated herein in its entirety by reference as a part of the present application.

The invention claimed is:

1. A mobile device, comprising: a direction sensor, a signal processing unit and a directional antenna unit,
   the direction sensor is configured to detect a current movement direction of the mobile device;
   the signal processing unit is configured to determine an antenna adjustment direction of the directional antenna unit according to the current movement direction, wherein the antenna adjustment direction is related to the current movement direction;
   the directional antenna unit is configured to transmit electromagnetic wave for communication of the mobile device and is configured to adjust the antenna direction from a first direction to a second direction such that the strength of electromagnetic waves transmitted by the directional antenna unit in the second direction is greater than that of the electromagnetic waves transmitted in the first direction,
   wherein the signal processing unit further comprises a signal detecting unit,
   the signal detecting unit is configured to detect signals from a signal cell in the current movement direction, when signals from the signal cell in the current movement direction are detected, the signal processing unit sends an antenna adjustment instruction to the directional antenna unit that adjusts the antenna direction from the first direction to the second direction according to the antenna adjustment instruction and the antenna adjustment direction.

2. The mobile device of claim 1, wherein the direction sensor comprises a gyroscope and/or an acceleration sensor.

3. The mobile device of claim 1, wherein the signal detecting unit is further configured to further determine a signal strength of the signal cell when detecting signals from the signal cell in the signal adjustment direction;
   when the signal strength is greater than a preset strength threshold, the signal processing unit sends the antenna adjustment instruction to the directional antenna unit.

4. The mobile device of claim 1, wherein the mobile device further comprises a positioning device,
   the positioning device is configured to detect a current location of the mobile device;
   the signal processing unit is further configured to determine the antenna adjustment direction of the directional antenna unit according to the current position and the current movement direction.

5. The mobile device of claim 4, wherein,
   the signal processing unit is further configured to:
   determine a next signal cell the mobile device is to enter according to the current location and the current movement direction of the mobile device;
   determine a location of a base station of the next signal cell; and
   determine an antenna adjustment direction of the directional antenna unit based on the location of the base station.

6. The mobile device of claim 5, wherein,
   the signal processing unit is further configured to:
   determine a first signal cell and a second signal cell that the mobile device is to enter according to the current location and the current movement direction of the mobile device, and a signal detecting unit in the signal processing unit detects signal strength of the first signal cell and the second signal cell and determines a signal cell with a strongest signal strength; and
   determine the signal cell with the strongest signal strength as the next signal cell the mobile device is to enter.

7. The mobile device of claim 6, wherein,
   the signal processing unit comprises a signal receiver and a signal modulator,
   the signal receiver is configured to acquire information on the antenna adjustment direction;
   the signal modulator is configured to modulate the information on the antenna adjustment direction from digital signal into the analog electrical signal.

8. The mobile device of claim 1, wherein,
   the directional antenna unit is at least one of the phased array directional antenna or the metamaterial antenna.

9. The mobile device of claim 1, wherein, when the mobile device moves along the current movement direction, the directional antenna unit compares an angle value between the current movement direction and of the antenna direction and determines whether direction correction is necessary, and if an accumulated error of a plurality of samplings is greater than a preset angle value for the directional antenna unit, determines that the antenna adjustment function needs to be corrected.

10. A method for adjusting an antenna of a mobile device, comprising:
   detecting a current movement direction of the mobile device;
   determining an antenna adjustment direction of the directional antenna unit in the mobile device according to the current movement direction, wherein the antenna adjustment direction is related to the current movement direction;
   adjusting a direction of the antenna from a first direction to a second direction according to the antenna adjustment direction;
   detecting signals from a signal cell in the current movement direction based on the antenna adjustment direction; and
   sending an antenna adjustment instruction to the directional antenna unit after signals from the signal cell is detected in the current movement direction,
   wherein adjusting the direction of the antenna from the first direction to the second direction according to the antenna adjustment direction further comprises:

adjusting the direction of the antenna from the first direction to the second direction according to the antenna adjustment instruction and the antenna adjustment direction.

11. The method of claim 10, wherein the direction sensor comprises a gyroscope and/or an acceleration sensor.

12. The method of claim 11, wherein the method further comprising:
   detecting a current location of the mobile device;
   wherein determining an antenna adjustment direction of the directional antenna unit in the mobile device according to the current movement direction further comprises:
   determining the antenna adjustment direction of the directional antenna unit according to the current position and the current movement direction.

13. The method of claim 12, wherein,
   determining the antenna adjustment direction of the directional antenna unit according to the current position and the current movement direction further comprises:
   determining a next signal cell the mobile device is to enter according to the current location and the current movement direction of the mobile device;
   determines a location of a base station of the next signal cell;
   determines an antenna adjustment direction of the directional antenna unit based on the location of the base station.

14. The method of claim 13, wherein,
   determining a next signal cell the mobile device is to enter according to the current location and the current movement direction of the mobile device further comprises:
   determining a first signal cell and second signal cell that the mobile device is to enter according to the current location and the current movement direction of the mobile device;
   detecting signal strength of the first signal cell and the second signal cell and determining a signal cell with a strongest signal strength;
   determining the signal cell with the strongest signal strength as the next signal cell the mobile device is to enter.

15. The method of claim 11, wherein,
   the directional antenna unit is at least one of the phased array directional antenna or the metamaterial antenna.

16. The method of claim 10, wherein the method further comprises:
   establishing connection with and communicating with a signal cell in the second direction in response to that the direction of the antenna direction is adjusted from the first direction to the second direction.

17. The method of claim 10, wherein the method further comprises:
   further determining a signal strength of the signal cell when signals from the signal cell is detected in the signal adjustment direction;
   wherein sending an antenna adjustment instruction to the directional antenna unit after signals from the signal cell is detected in the current movement direction further comprises:
   when the signal strength is greater than a preset strength threshold, sending the antenna adjustment instruction to the directional antenna unit.

18. The method of claim 10, wherein, when the mobile device moves along the current movement direction, the directional antenna unit compares an angle value between the current movement direction and the antenna direction and determines whether direction correction is necessary, and if an accumulated error of a plurality of samplings is greater than a preset angle value for the directional antenna unit, determines that the antenna adjustment function needs to be corrected.

* * * * *